United States Patent
Nagatsu et al.

(10) Patent No.: US 6,742,502 B2
(45) Date of Patent: Jun. 1, 2004

(54) ENGINE CONTROL METHOD AND APPARATUS

(75) Inventors: Yoshiyuki Nagatsu, Shuuchi-gun (JP); Naoya Isoda, Shuuchi-gun (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 10/249,357

(22) Filed: Apr. 2, 2003

(65) Prior Publication Data

US 2003/0136379 A1 Jul. 24, 2003

Related U.S. Application Data

(63) Continuation-in-part of application No. 09/682,457, filed on Sep. 5, 2001, now Pat. No. 6,626,145.

(51) Int. Cl.[7] .................................................. F02P 5/15
(52) U.S. Cl. .............................. 123/406.24; 123/406.59
(58) Field of Search ......................... 123/406.2, 406.24, 123/406.23, 406.45, 406.59, 406.6, 436, 617; 701/101, 102, 103, 110, 111

(56) References Cited

U.S. PATENT DOCUMENTS

| | | |
|---|---|---|
| 3,870,869 A | 3/1975 | Eberle et al. |
| 3,969,614 A | 7/1976 | Moyer et al. |
| 4,197,767 A | 4/1980 | Leung |
| 4,276,600 A | 6/1981 | Hartford et al. |
| 4,291,383 A | 9/1981 | Tedeschi et al. |
| 4,301,678 A | 11/1981 | Full et al. |
| 4,309,759 A | 1/1982 | Tokuda et al. |
| 4,309,971 A | 1/1982 | Chiesa et al. |
| 4,380,800 A | 4/1983 | Wilkinson |
| 4,383,440 A | 5/1983 | Murata |
| 4,403,584 A | 9/1983 | Suzuki et al. |
| 4,581,703 A | 4/1986 | Bassi et al. |
| 4,715,009 A | 12/1987 | Bohmler et al. |
| 4,765,306 A | 8/1988 | Scarnera et al. |
| 4,941,445 A | 7/1990 | Deutsch |
| 4,947,808 A | 8/1990 | Kawamura |
| 4,972,818 A | 11/1990 | Nomura et al. |
| 5,047,943 A | 9/1991 | Takahata et al. |

(List continued on next page.)

FOREIGN PATENT DOCUMENTS

| | | |
|---|---|---|
| EP | 0893591 A2 | 1/1999 |
| EP | 1283358 A2 | 2/2003 |
| GB | 2196153 | 4/1988 |
| GB | 2237388 | 5/1991 |
| GB | 5313200 | 11/1997 |
| JP | 04-265442 | 9/1992 |
| JP | 08-226367 | 9/1996 |

OTHER PUBLICATIONS

European Search Report Dated Aug. 22, 2003.
Development of a Low–Cost Fuel Injection System For Use on Small Utility Engines, SAE 1999–01–3292/JSAE 9938047, pp. 360–367, Paul M. Gartner, Copyright 1999 Society of Automotive Engineers, Inc.

*Primary Examiner*—Willis R. Wolfe
(74) *Attorney, Agent, or Firm*—Ernest A Beutler (57) ABSTRACT

An improved method and system for the control of an engine system such as the spark timing. The control senses the speed variations either during a portion of a complete cycle and a complete cycle and/or from cycle to cycle in order to determine the load on the engine from preprogrammed maps based upon the engine characteristics. From this load and the speed reading, it is possible to obtain the desired engine control. In addition the timing is set in this method only under certain specified conditions and only in response to certain specific parameters. This not only reduces the costs of the system by reducing the number of sensors, but also permits adjustments to be made more rapidly.

7 Claims, 11 Drawing Sheets

U.S. PATENT DOCUMENTS

| | | | |
|---|---|---|---|
| 5,284,116 A | * | 2/1994 | Richeson, Jr. ............ 123/406.2 |
| 5,497,748 A | * | 3/1996 | Ott et al. ................. 123/406.6 |
| 5,921,221 A | * | 7/1999 | Davis et al. ........... 123/406.24 |
| 5,988,140 A | * | 11/1999 | Gartner et al. ......... 123/406.24 |
| 6,006,155 A | * | 12/1999 | Wu et al. ................... 701/111 |
| 6,155,241 A | * | 12/2000 | Hohner et al. ......... 123/406.24 |
| 6,272,425 B1 | * | 8/2001 | Herndon ................ 123/406.24 |
| 6,502,549 B1 | * | 1/2003 | Hoshino et al. ............ 701/111 |
| 6,626,145 B2 | * | 9/2003 | Enoyoshi et al. ...... 123/406.24 |
| 2002/0043245 A1 | | 4/2002 | Enoyoshi ............... 123/406.24 |

* cited by examiner

<Study of correlation between VR value and load>

(A) Measurement result in constant speed running a>b>c>d>e>f (B) VR value vs. Load correlation 3-D map

ENGINE CONTROL METHOD AND APPARATUS

CROSS REFERENCE TO RELATED APPLICATIONS

This application is a continuation in part of the application of the same title, Ser. No. 09/682,457, filed Sep. 5, 2001, invented by us and another and assigned to the assignee hereof, now U.S. Pat. No. 6,626,145.

BACKGROUND OF INVENTION

This invention relates to an engine control method and apparatus and more particularly to an improved, simplified, highly effective and yet low cost arrangement for such control.

In internal combustion engines, a wide variety of systems and methodology are employed for engine control. Generally, smaller and lower volume engine applications incorporate generally less sophisticated controls than those employed on larger production volume engines such as automotive engines. Even in the small displacement lower production volume engines, for example those used in motorcycles, the engine control can become quite complicated.

Figure 1:
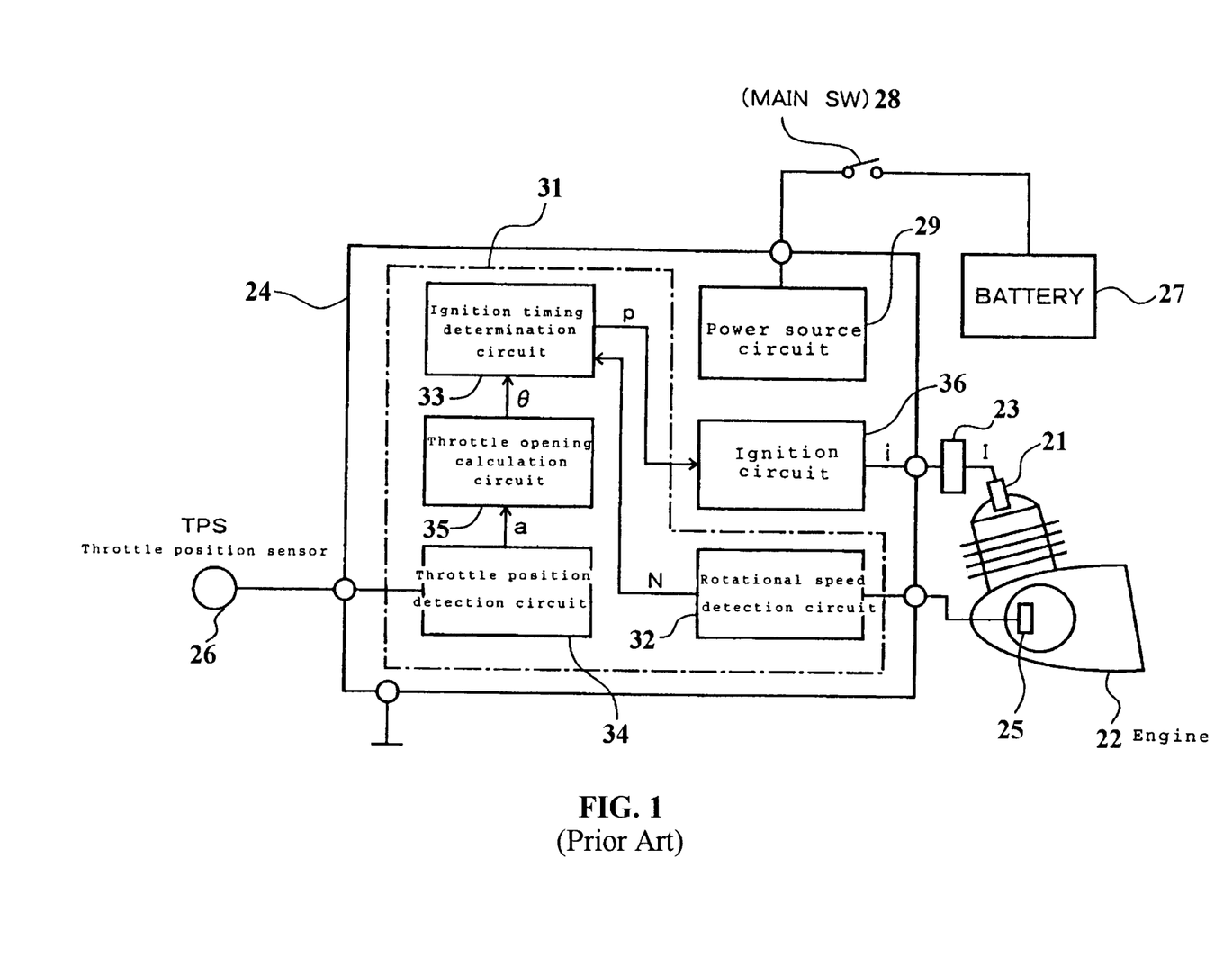
FIG. 1 is a partially schematic view showing a prior art type of engine control system.
Figure 3:
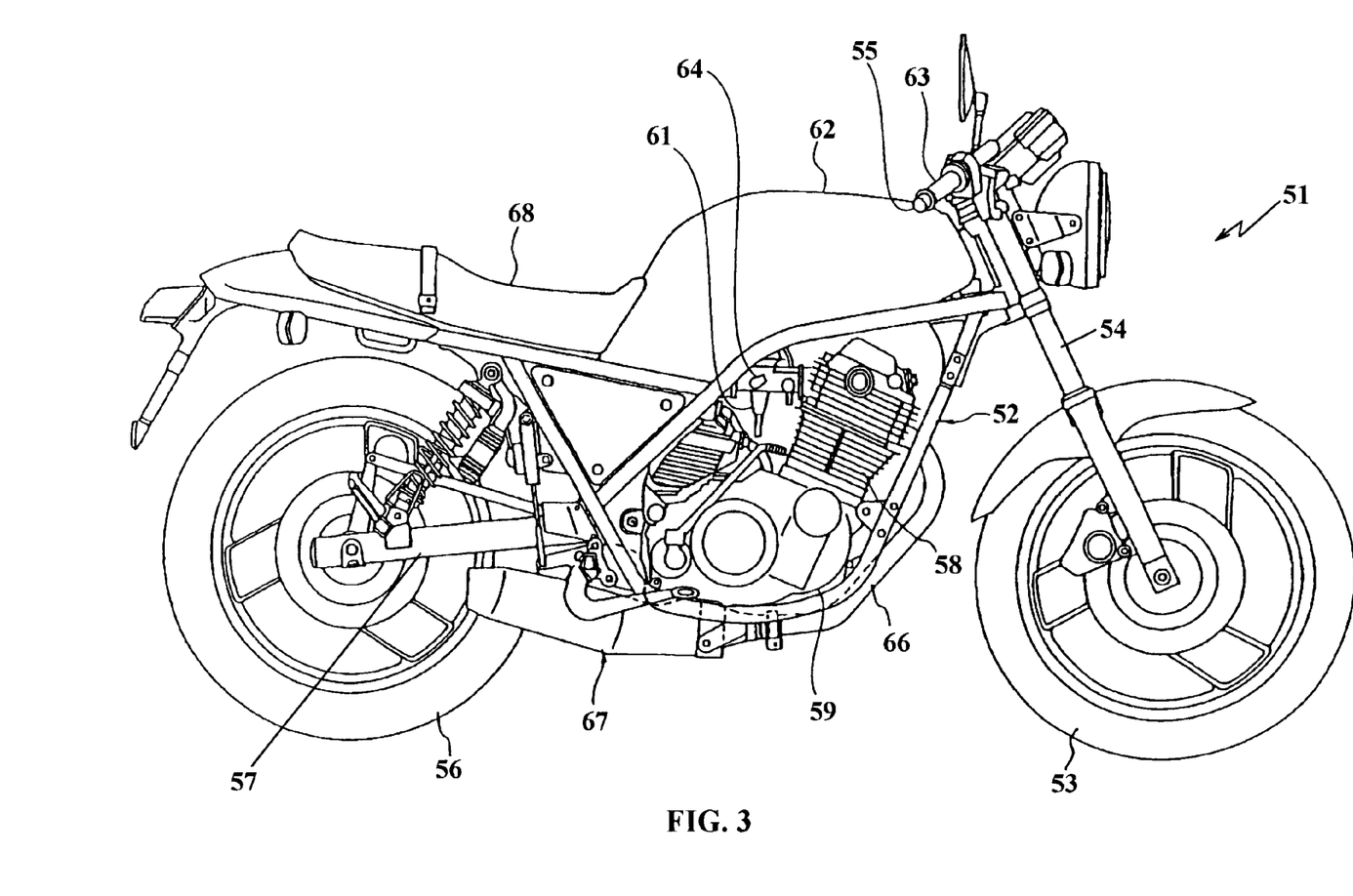
FIG. 3 is a side elevational view of the type vehicle which the prior art system can be utilized and also which can utilize the invention.

For example and as shown in FIG. 1, the spark control for a motorcycle engine is shown schematically. The control arrangement is intended to control the firing of a spark plug 21 associated with an internal combustion engine 22 that powers the motorcycle, which is not shown in this figure, but which may be of a construction as generally shown in FIG. 3. An amplified spark voltage is applied to the spark plug 21 from an ignition coil 23, which, in turn, is controlled by an ignition timing control arrangement, indicated schematically at 24. This timing control arrangement 24 receives the inputs from a number of engine-associated sensors. These include a crankcase rotational speed sensor 25 which may comprise a pulser coil and a throttle position sensor 26, which is coupled to the throttle control mechanism for the engine 22 and inputs a signal to the control 24 indicative of engine load and/or operator demand.

Electrical power is provided to the ignition control circuit 24 from a battery 27 through a main switch 28. This battery power is applied to a power source circuit 29 of the control 24 and specifically to an electronic circuit 31 which may comprise a microprocessor.

The output from the engine speed sensor 25 is transmitted to a rotational speed detector circuit 32, which counts the number of pulses generated in a time period so as to determine the rotational speed of the crankshaft of the engine 22.

This outputs a speed signal N to an ignition timing determining circuit, indicated at 33. In addition, the throttle position sensor 26 inputs a signal to a throttle position detector circuit 34. This detector circuit 34 outputs a signal "a" to a throttle opening calculating circuit 35. This, in turn, outputs a throttle angle position θ to the ignition timing determination circuit 33.

From these inputs, the ignition timing determining circuit outputs a signal at a time determined from maps contained in a memory of the circuit 31 to an ignition circuit 36 which may be of the capacitor discharge type so as to output an electrical output "i" to the coil 23 which is stepped up by the coil 23 to a value "I" for firing the spark plug 21 in a well-known manner.

Figure 2:
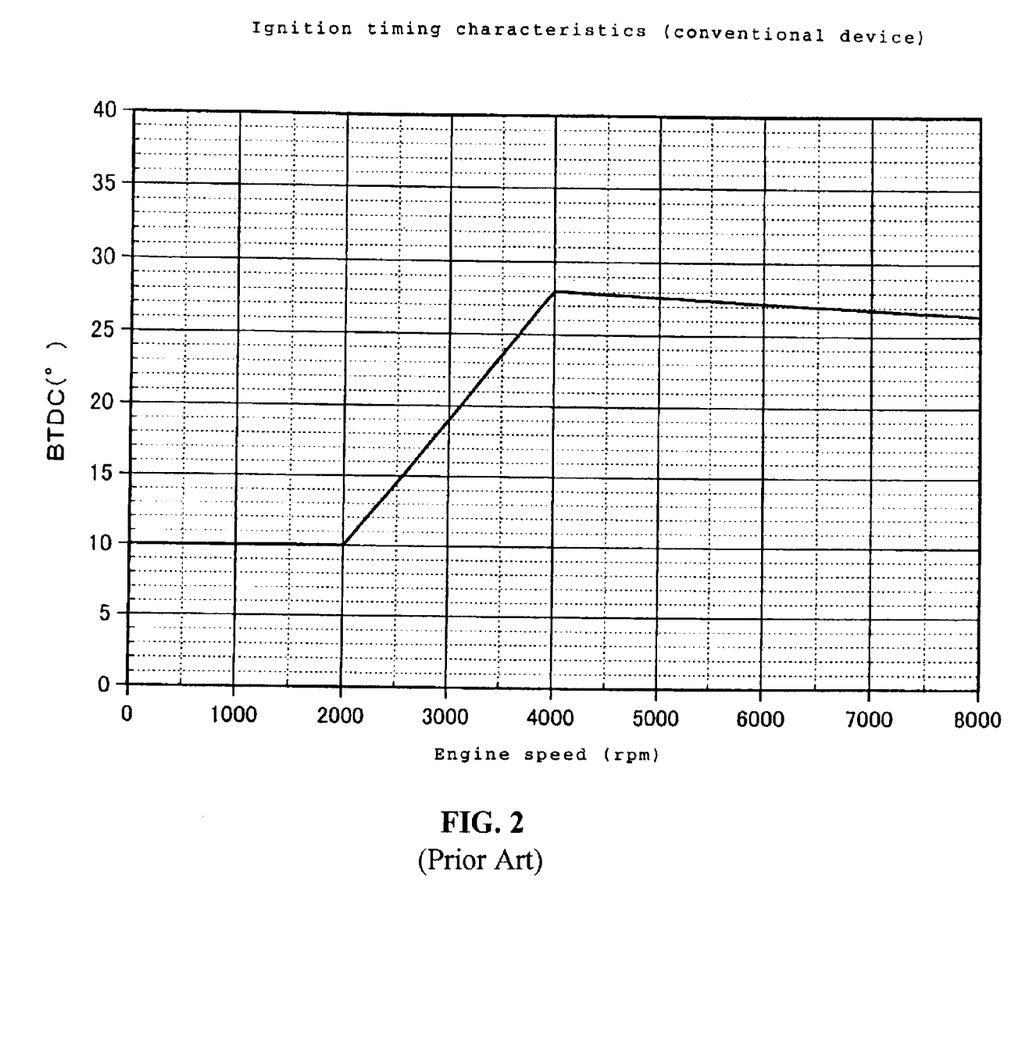
FIG. 2 is a graphical view showing one of the speed and timing maps for a given engine load utilized in the prior art control system.

FIG. 2 is a graph showing one of the maps which may be incorporated in the circuit 31 and shows how the spark timing is varied in response to engine speed for given load as determined by the throttle opening circuit. There may be a family of such curves so as to vary the ignition timing in response to both throttle position and engine speed.

Rather than using a throttle position sensor, load may be sensed by intake manifold vacuum. Either method, however, requires added sensors, transducers and circuitry.

It has been found that merely using engine speed and load as detected by something such as a throttle position or intake manifold vacuum sensor does not actually provide as good a control as desired. That is, these two factors by themselves may not be sufficient to provide the desired degree of control.

Although systems have been provided for automotive applications wherein more sophisticated controls are employed, this further adds to the cost of the system and does not always provide the optimum results.

There have also been other devices than throttle position sensors or vacuum sensors for sensing intake manifold vacuum for determining engine load. It also has been determined that engine load may be found by comparing engine speed from one revolution to another. However, these systems also tend to be complicated and do not lend themselves particularly low production volume, low cost vehicle applications. They also have the disadvantage of requiring a plurality of different types of sensors.

Other arrangements have been proposed wherein engine speed is measured for less than one complete revolution of the engine and variations from cycle to cycle have been employed to determine engine load. These systems, however, have for the most part, required multiple sensors and also require some delay from the sensed conditions before adjustment is being made.

In the aforenoted co-pending application a system and method is disclosed that measures engine speed for a portion of a revolution and for a complete revolution utilizing a single sensor and makes engine system adjustments in response to the variation of the measured ratios. This permits a more accurate control with a relatively simple system. However, further improvements can be made.

It is desirable to keep the system as simple and as low a cost as possible. The inventors have discovered that cycle to cycle adjustments are not always necessary or even desirable. Also the sensitivity of the system can be effectively varied depending on the type of vehicle to which it is applied.

It is therefore a principle object of this invention to provide a highly effective, simple and low cost engine control device and method.

It is a further object of this invention to provide an engine control device and method that can utilize a relatively simple and compact computer and memory.

SUMMARY OF INVENTION

This invention is adapted to be embodied in an internal combustion engine control system and a method for operating an engine for controlling a system of the engine. The engine has a driven shaft. A sensor arrangement is associated with the driven shaft for sensing the instantaneous rotational speed of the driven shaft during the rotation of the driven shaft for less than a complete rotation and for sensing the rotational speed of the driven shaft for a complete revolution thereof including the measured less than complete rotation during a first rotation of the driven shaft and for sensing same two rotational speeds of the driven shaft during the immediately succeeding rotation of the driven shaft. A control determines the ratios between the partial and complete revolution measured for each of the two revolutions and the difference between them. The control adjusts the control of the engine system in response to the difference only if the difference is between a pair of predetermined values. In addition the adjustment is only made with certain other parameters to offer further simplification and provide a smoother operation.

In accordance with a first feature of the engine, the other parameter is that adjustment is made only in whole integers to minimize the necessary memory.

In accordance with a second feature of the engine, the other parameter is that the ratio is utilized to make the adjustment only within a predetermined range of the total expected variation range to avoid excessive calculations.

In accordance with a third feature of the invention, the engine powers a vehicle and the other parameter is that the adjustment is made only within a predetermined range of engine loadings to avoid excessive calculations.

DETAILED DESCRIPTION

Referring now in detail to the drawings and initially to FIG. 3, a motorcycle constructed and operated in accordance with the invention is identified generally by the reference numeral 51. Also this is the type of vehicle with which the aforenoted prior art constructions are applied. It is to be understood that this specific application for the invention is only a typical one with which the invention may be utilized.

A motorcycle is chosen at the exemplary embodiment because the invention, as should be apparent from the foregoing description, has particular utility in conjunction with relatively small, low production volume engines. However, it should also be apparent that the simplicity of the invention lends itself to use with other applications such as automotive application due to the improvement in fuel economy and performance without significant cost penalties.

The motorcycle 51 is comprised of a frame assembly, indicated generally by the reference numeral 52, that dirigibly supports a front wheel 53 on a front fork 54 that is steered by a handle bar assembly 55 in a well-known manner.

A rear wheel 56 is supported for suspension movement relative to the frame 52 by means that includes a trailing arm assembly 57. An engine, indicated generally by the reference numeral 58, and having a combined crankcase transmission assembly 59 is suitably suspended in the frame 52 and drives the rear wheel 56 through a suitable drive arrangement.

The engine 58 has a carburetor 61 to which fuel is supplied from a fuel tank 62 mounted above the engine 58 on the frame assembly 52. A throttle valve is associated with this carburetor 61 and is operated by a twist grip throttle control 63 mounted on the handle bar 55. With conventional systems, but not necessary with this invention, a throttle position sensor 64 is associated with the throttle valve shaft of this throttle valve.

The engine 58 is provided with one or more spark plugs 65 (FIG. 4) that are fired by the ignition system, which will be described shortly.

The combustion gases are discharged from the engine exhaust port through an exhaust pipe 66 and muffler 67, which has an atmospheric discharge.

The engine 58 in accordance with the illustrated embodiment operates on the four stroke principal, but as will become apparent to those skilled in the art, the invention can also be utilized with two cycle engines.

A seat 68 is positioned on the frame assembly 52 to the rear of the fuel tank 62 for accommodating the rider in a well-known manner.

Refering now primarily to FIGS. 4 and 5, the control system for controlling the engine system, in this case the firing of the spark plug 65 will be described in more detail. The engine 58 has a crankshaft 69 to which a flywheel 71 is affixed for rotation in a known manner. Although the invention is depicted in association with a crankshaft positioned sensor, it may be associated with any other shaft that is driven by the engine in timed relation.

A pulser type sensor 72 is associated with the flywheel 71 and specifically with a timing mark 73 affixed to its outer peripheral surface. The timing mark 73 has a leading edge 74 and a trailing edge 75 which, when passing the sensor 72 will output pulses that can be measured so as to measure the time it takes the timing mark 73 to pass the sensor 72. This constitutes an instantaneous rotational speed for the engine 58 during a portion of a complete rotation.

The timing mark 73 is considerably wider, in accordance with the invention, than those normally used. Such widening is not necessarily required, but can improve the control. For example the width of the mark 73 be equal to 60° of crankshaft rotation.

The timing mark is set so that it will first trigger a pulse as the engine begins to approach top dead center (TDC) position and another pulse after the crankshaft is at or near top dead center. The specific angles may vary depending upon the particular application.

Nevertheless, because of the four-stroke operation, these pulses are generated at the end of the compression and exhaust strokes. Prior art methods may have utilized speed measurements at the power stroke, but it has been found that the compression and exhaust stroke are much more accurate in providing an indication of engine load and this constitutes one of the features of the invention will be described in more detail later, by reference particularly to FIG. 6.

With a two cycle engine the two measurements per revolution will provide adequate information for engine control on the next revolution.

Figure 4:
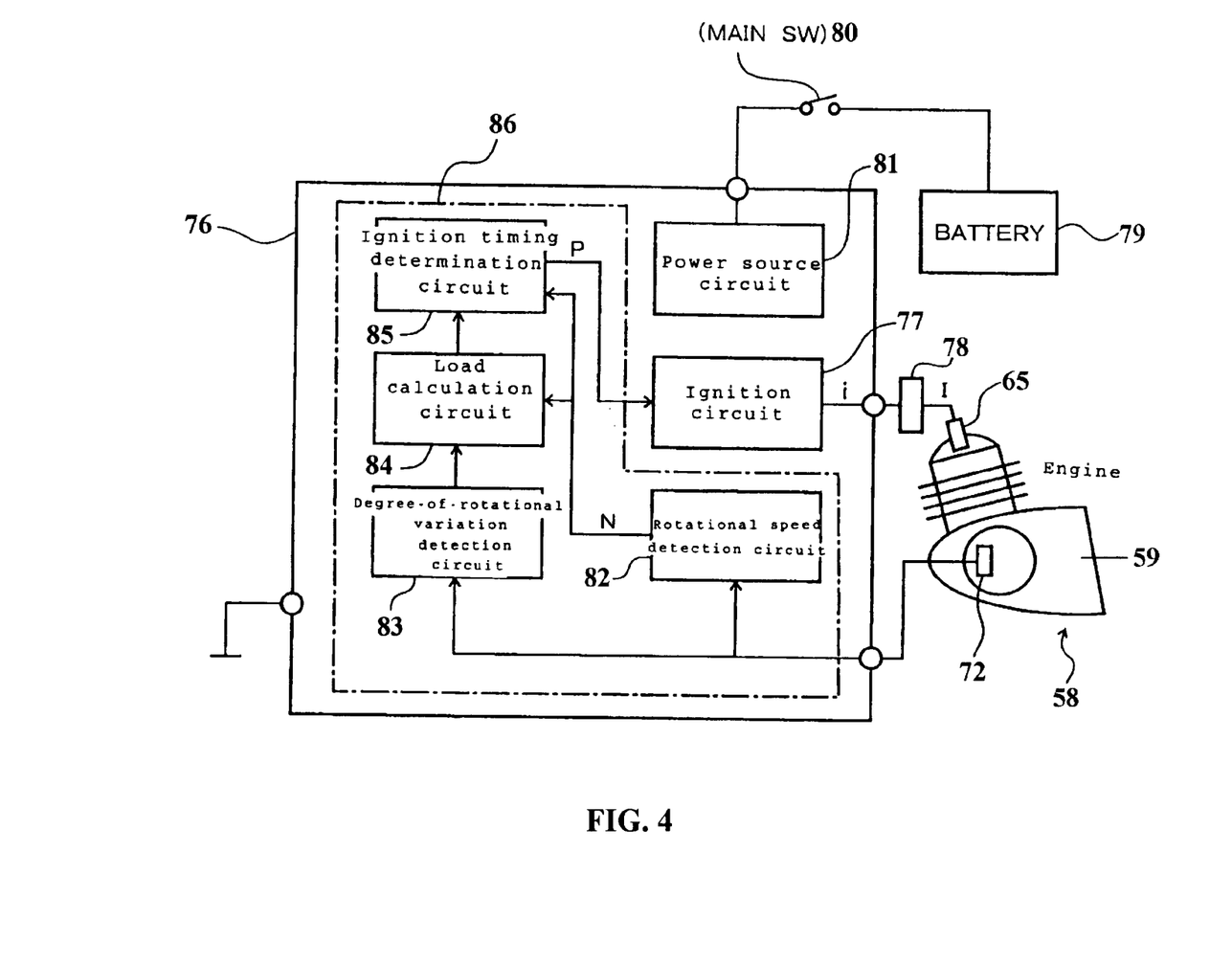
FIG. 4 is a partially schematic view, in part similar to FIG. 1, but shows an engine control system embodying the invention.
Figure 5:
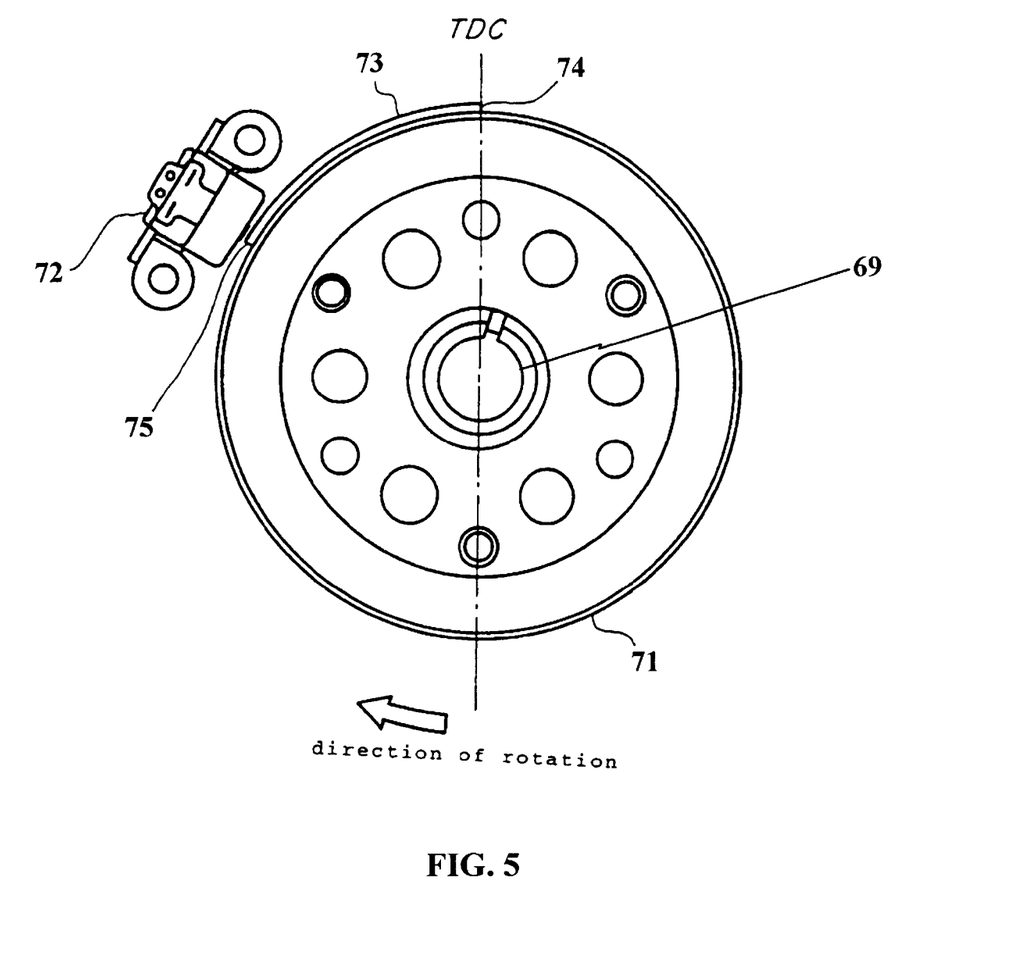
FIG. 5 is a side elevational view showing the sensor and timing mark.

As seen in FIG. 4, the output from the sensor 72 is delivered to an engine system timing control device 76, which contains an ignition circuit 77 which can be basically a conventional ignition circuit of the CDI type, which outputs a signal, "i" to a coil 78 that outputs a pulse "I" for firing the spark plug 65 in a known manner.

This engine timing control system is powered with electrical power from a battery 79 through a main switch 81.

The output from the sensor 72 is transmitted to a rotational speed detection circuit 82, which outputs a signal N indicative of the rotational speed of the engine during each complete revolution cycle. In addition, the outputs from the leading and trailing edges 74 and 75 of the timing mark 73 registered on the sensor 72 are transmitted to a degree of rotational variation detector circuit 83. This circuit 83 selectively outputs a signal indicative of the speed difference to a load calculation circuit 84.

In the described embodiment, the flywheel 71 may be formed of a magnetic material, and the sensor or coil 72 faces the rotational locus of the timing mark 73. In this case, opposite ends of the timing mark 73 are detected from changes in magnetic resistance in the magnetic path passing through the iron core of the coil 72. Alternatively the timing mark 73 may be formed from permanent magnets fixed on the flywheel 71 at positions a given angle away from each other, and the sensor may be a magnetic sensor such as a Hall element for detecting passage of the permanent magnets. Alternatively, the mark may be a slit, which may be detected optically with an LED and a light receiving element.

The load calculating output circuit operates so as to determine a load factor that is derived from as map as will be described. This output is delivered to an ignition timing determination circuit 85 which operates in accordance with the control routine shown in FIG. 7 so as to output a signal P to the ignition circuit 77 for firing the spark plug 65 at the appropriate time for the engine speed and engine load.

The circuit portions 82, 83, 84 and 85 are all located within a CPU 86 of the engine control system 76.

Refering now primarily to FIG. 6 and later to FIG. 7, the basic control method used in connection with the invention is to measure revolution to revolution changes in speed "R". From that difference it is possible to determine engine load. Then by consulting a map of ignition control timing and speed, the appropriate ignition timing can be determined in accordance with an important feature of the invention, this specific load determining method is not utilized under all running conditions to simplify the system without significantly decreasing the performance. In fact, in some cases, even smoother operation is possible utilizing the modified methodology.

Figure 6:
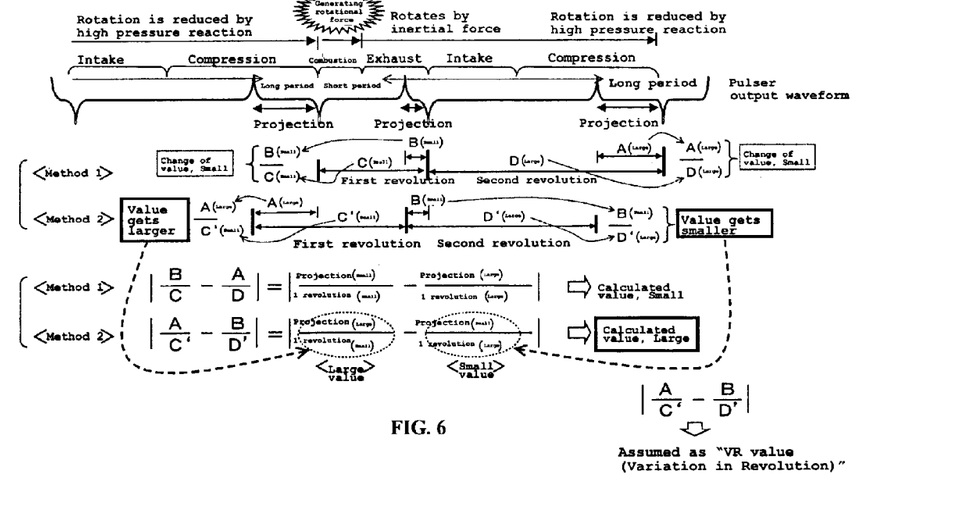
FIG. 6 is a timing diagram utilized to explain the importance of choosing the appropriate times for making the speed measurements to optimize the accuracy of the control.
Figure 7:
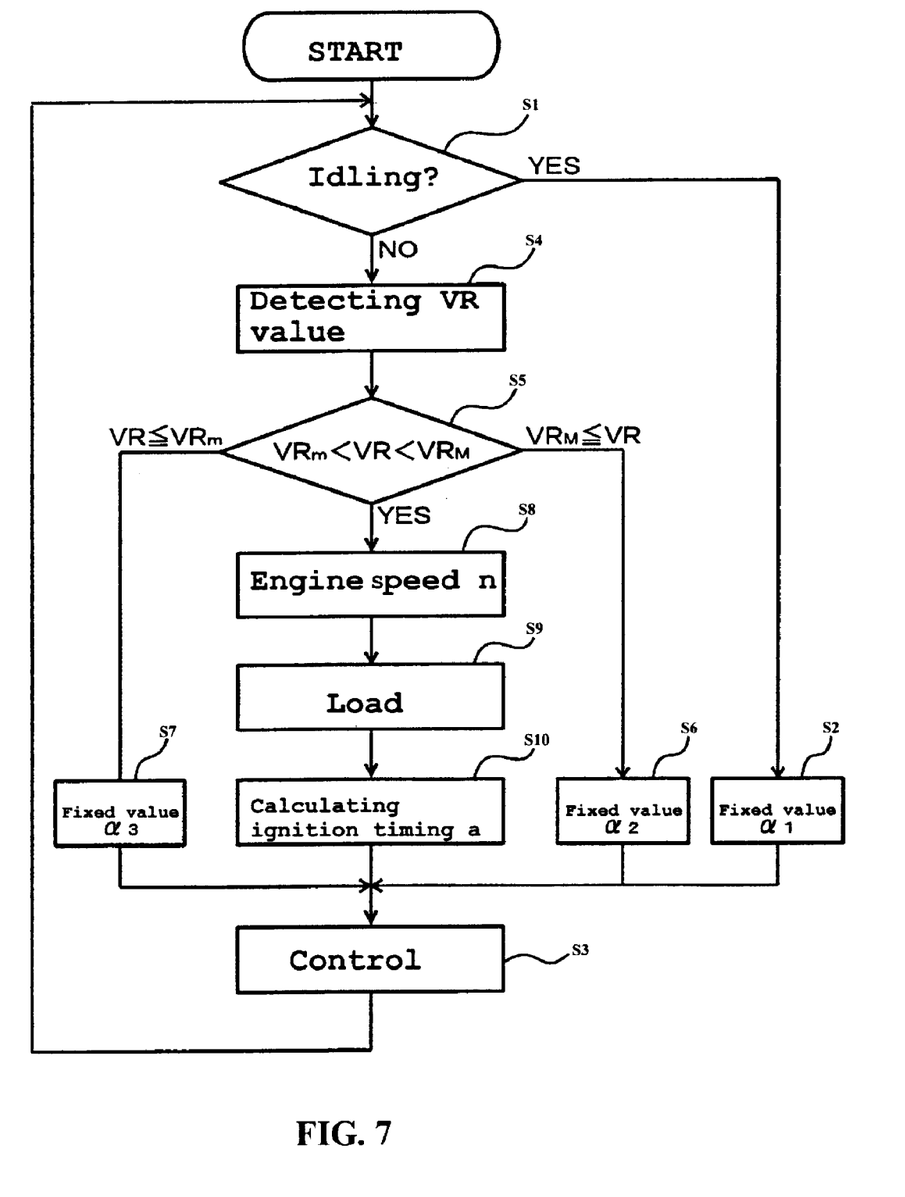
FIG. 7 is a block diagram showing a control routine, utilized to practice the invention.

FIG. 6 shows schematically how the output from the rotational sensor, in the specific example the coil 72 outputs its signal to the circuit portions 82 and 83 to determine the degree of rotational variation R. The method to determine the degree of rotational variation R is one in which a ratio (t/T) is determined by measuring the time between the leading and trailing pulses for each of two successive rotations to determine the change in the ratios, referred to as the difference or variation in revolution "VR". This figure (FIG. 6) will also be utilized to explain the importance of order of the specific strokes that are measured from which the difference VR is obtained.

As noted, pulses are generated as the timing mark 73 passes the sensor coil 72.

Therefore, the output waveform of the pulser coil will be a positive (+) pulse at when the leading edge 74 passes at 60° BTDC of the mark and a negative (−) pulse when the trailing end 75 passes at TDC. These pulses are shown in FIG. 6 and two methods are compared in accordance with methods described as "<Method 1>" and "<Method 2>".

In accordance with <Method 1>, the time intervals C, D of the negative (−) pulses including the combustion and the exhaust strokes are taken as cycles of one rotation and the passing time of the projection (mark) in each cycle C, D as B, A to determine the ratio B/C, A/D for each cycle. Then, the absolute value of the difference between these values, B/C−A/D, is determined as the indication of the engine load.

However, the present invention finds the engine load by using the "<Method 2>", which the time intervals C", D" of the positive (+) pulse are assumed as cycles in one rotation and the ratio A/C", B/D" is determined for each cycle. The absolute value of the difference between these values, |A/C"−B/D"|, is defined as the VR value.

As seen in FIG. 6, effects by the load fluctuation appear such that the time of the exhaust and the intake strokes is relatively longer than the time of the combustion and the compression strokes. As a result, both the numerator and denominator of the ratio (B/C) increase or decrease in reference to the increase or decrease of the load according to the "<Method 1>", and both the numerator and denominator of the ratio (A/D) increase or decrease in the same way. Therefore, changes in the difference between two values, |B/C−A/D|, according to the load fluctuation is relatively small.

On the other hand, according to the "<Method 2>", the ratio (A/C") becomes such that the denominator C" decreases and the numerator A increases in reference to the increase of the load, and the ratio (B/D") becomes such that the denominator increases and the numerator decreases, so that the changes in the difference between two values, |A/C"−B/D"|, according to the load fluctuation become larger. The present invention is to determine the VR value and therefore the engine load by using the "<Method 2>". To more effectively determine the engine load because of the larger values obtained by this method.

This methodology is utilized in performing the method, which will now be described in detail by reference to FIG. 7. First, at the Step S1 it is determined if the engine is running in an idling condition. This may be the condition immediately after a warm start up. In any event, if the engine is operating at an idling speed, the ignition timing α is set to a fixed value α 1 at the step S2. Then ignition control is performed at the step S3. The program then repeats to the step S1.

If the engine 58 is found not to be in an idling state at the step S1, the degree of rotational variation detection circuit 83 detects the degree of rotational variation VR at the step S4. The microcomputer in the electronic circuit 86 determines whether or not the degree of variation VR is within a given range of $VR_m$ $VR_M$ the step S5. If the variation is out of this range, the ignition timing is set to a fixed value α 2 or α 3 at either the step S6 or S7.

The values of the fixed degrees of advance at idle $\alpha_1$ is about 10° before top dead center. The values of $\alpha_2$ $\alpha_3$ may be in the range of 20° to 30° before top dead center and are set to avoid errors under small deviations in VR to avoid the effects of electrical noise.

Figure 8:
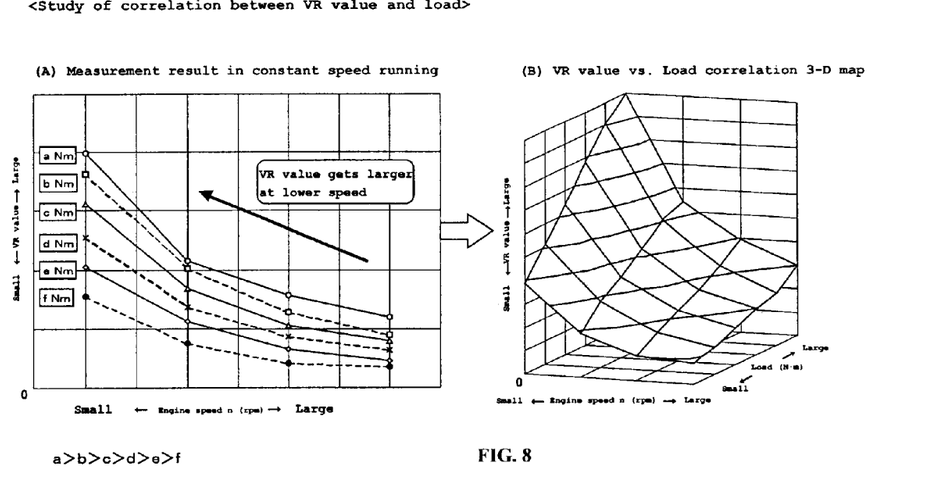
FIG. 8 is a graphical view showing the relationship between the VR (speed ratio change) and actual engine load and engine speed.

If at the step S5 the value of VR is determined to be within this range of $VR_m$–$VR_M$, the load calculation circuit 84 determines load L using engine speed N determined by the rotational speed detection circuit 82 at the step S8 and looking up the load L from the conversion map of FIG. 8 at the step S9.

The left hand (A) side of FIG. 8 shows the measurement result of the determination for the relation between the VR value and the engine load determined in accordance with the "<Method 2>" against different engine speeds n (rpm). The result shows that the engine load is uniquely determined in accordance with the engine speed n and the VR value. The right hand (B) side of FIG. 8 shows the result in the form of a 3-D map. The map shows that the load can be detected without special sensors for detecting the engine load such as a throttle sensor or an intake negative pressure sensor but with the pulser signal only. In addition, it is found that the range of change in the VR value is from 0 to 2.0.

Figure 9:
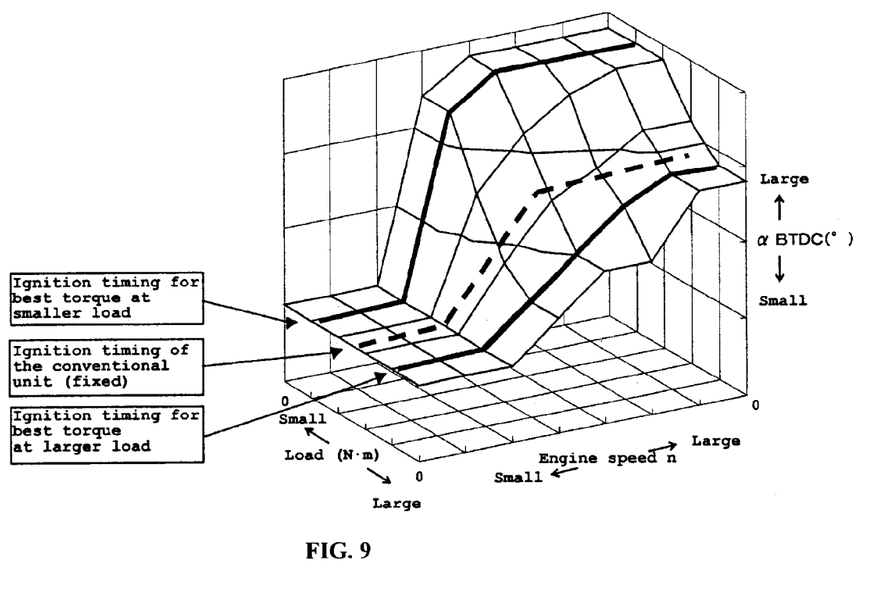
FIG. 9 is a three dimensional map comparing the ignition timing in accordance with the invention with the prior art method.

FIG. 9 is a 3-D map showing the ignition timing required for obtaining the maximum torque of the engine or the MBT (Minimum Advance for Best Torque) in relation to the load and the engine speed n. This figure also shows why the conventional ignition unit that varies the ignition timing according only to the engine speed n has not been able to make-full use of the engine performance, As seen the deviation from the MBT of the ignition timing becomes larger when the load varies. On the contrary, according to the present invention, the ignition timing is varied along with the MBT in accordance with the engine load, so that the present invention can make full use of the engine performance.

Referring back again to FIG. 7, the ignition timing determination circuit 85 then determines ignition timing α at the step S10 using this load L and engine speed N and looking up this value from the conversion map in FIG. 9. The ignition timing determination circuit 85 then sends an ignition signal P corresponding to the read ignition timing α to the ignition circuit 77, causing the ignition plug 65 to be fired. The program then moves to the step S3 and repeats.

Figure 10:
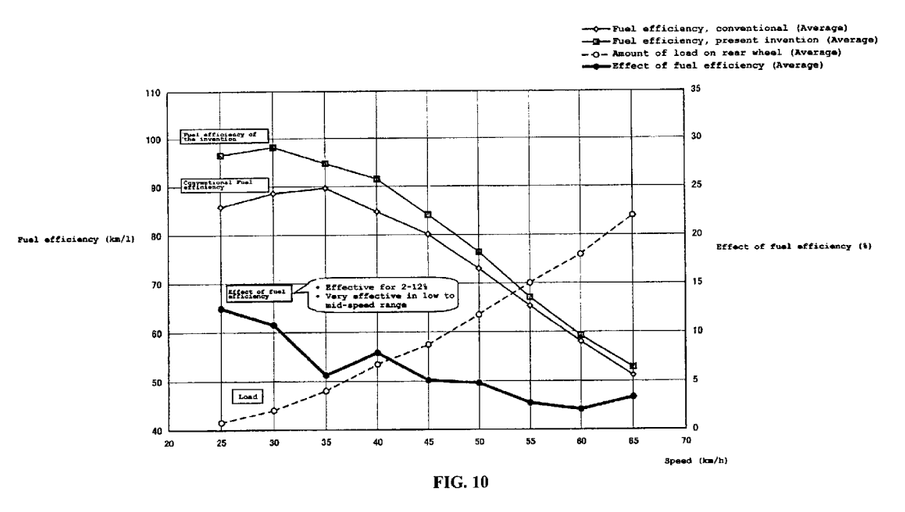
FIG. 10 is a graphical comparison of the fuel efficiency in accordance with the invention and the prior art method and the degree of improvement therebetween.

A comparison of fuel efficiency between the conventional ignition device and the present embodiment on the same engine is shown in FIG. 10. It will be seen that the fuel efficiency is improved for 2–12% according to the present embodiment.

Figure 11:
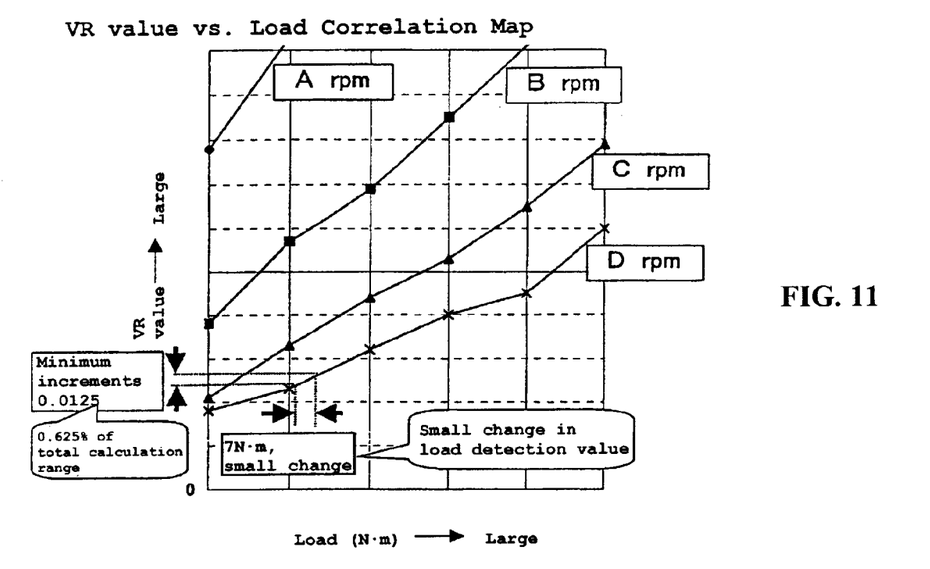
FIG. 11 is graphical view showing the correlation between the value of VR and actual engine load at several different engine speeds.

In the calculation of the VR value, the microcomputer operates to limit the variations in ignition timing so as not to be less than 1° as this will provide a smoother feel to the operator and simplify the system by permitting the use of a simpler computer. As shown in FIG. 11, the minimum variation intervals (minimum increments) of the VR value or resolution to 0.625% of the total variation range of the VR value. The value of 0.625% corresponds to 0.0125 of the VR value (=2.0×0.625/100). The load fluctuation in response to the change in the VR value increases in high engine speed and low load. Thus with a vehicle such as a motorcycle of approximately 100 kgf (kilogram-force, 1 kgf≈9.8N) in the vehicle weight or the like, it is found that the conditions as described above are nearly met if the minimum variation interval of the VR value is determined as the change in an engine load of approximately 7N·m (Newton-meters), also indicated as Nm, 1 kgf·m≈9.8N·m). Thus the resolution (=0.0125) corresponds to approx. 7N·m of the load change in the high engine speed and the low load.

Figure 12:
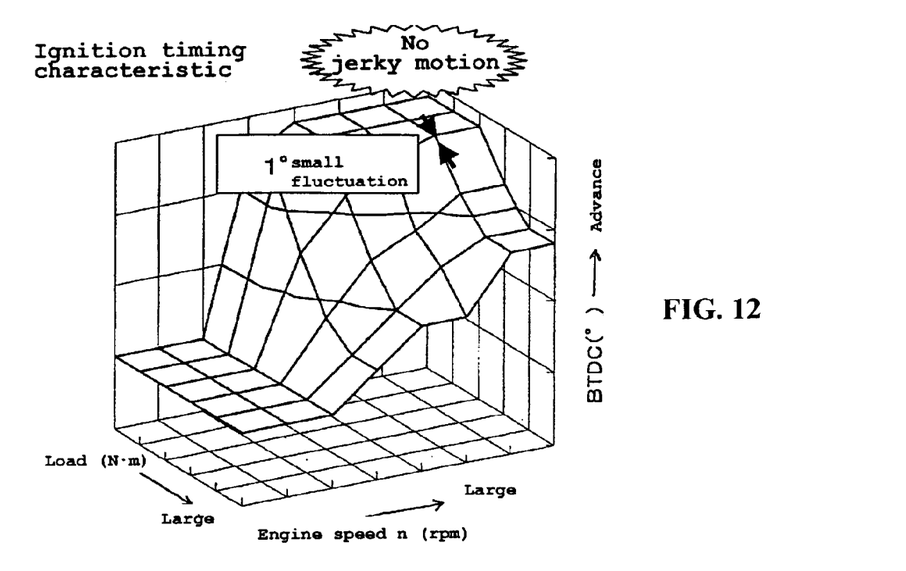
FIG. 12 is a three dimensional map of ignition timing, engine speed and load showing how limiting the magnitude of the adjustment obtains smoother feel to the operator.

Therefore, the fluctuation of the load, 7N·m, approximately corresponds to the change within 1° of the ignition timing as shown in FIG. 12. It is found that the change within 1° of the ignition timing corresponds to 7N·m of the change in the engine load and the change in that degree does not become significantly apparent to the operator.

Thus, from the foregoing description should be readily apparent that the described method and structure provides a very simple and low cost yet highly effective system for controlling an engine. Also, it should be understood although a specific example of engine ignition timing control is disclosed and has been described, other engine systems also may be controlled in a like manner such as fuel control with either fuel injection or other forms of fuel supply and throttle control for fly-by wire throttle systems. Other engine control applications with which the invention may be employed will present themselves to those skilled in art. Also, the system is capable of being used with either two or four cycle engines. Of course, further changes and modifications may be made without departing from the spirit and scope of the invention, as defined by the appended claims.

What is claimed is:

1. An interal combustion engine system control for controlling a system of the engine wherein the engine has a driven shaft, a sensor arrangement associated with said driven shaft for sensing the instantaneous rotational speed of said driven shaft during the rotation of said driven shaft for less than a complete rotation and for sensing the rotational speed of said driven shaft for a complete revolution thereof including the measured less than complete rotation during a first rotation of said driven shaft and for sensing same two rotational speeds of said driven shaft during the immediately succeeding rotation of said driven shaft, a control for determining the ratios between the partial and complete revolutions measured for each of the two revolutions and the difference between them, adjusts the control of said engine system in response to the difference only if the difference is other than a predetermined amount and if at least one other certain parameter is met.

2. An internal combustion engine system control as set forth in claim 1 wherein the other certain parameter is that the adjustment is made only in whole integers to minimize the necessary memory.

3. An internal combustion engine system control as set forth in claim 2 wherein the spark timing is controlled and the timing change is made in only a whole number of degrees.

4. An internal combustion engine system control as set forth in claim 1 wherein the other certain parameter is that the calculation is only made within a predetermined range of the total expected variation range to avoid excessive calculations.

5. An internal combustion engine system control as set forth in claim 4 wherein the range is within 0.625% of the total variation range.

6. An internal combustion engine system control as set forth in claim 1 wherein the engine powers a vehicle and the other certain parameter is that the calculation is only made within a predetermined range of engine loadings to avoid excessive calculations.

7. An internal combustion engine system control as set forth in claim 6, wherein the required change of engine loading is approximately 7N·m (Newton-meters).

* * * * *